United States Patent [19]

Ito et al.

[11] Patent Number: 5,693,115
[45] Date of Patent: Dec. 2, 1997

[54] PROCESS FOR PRODUCTION OF GLASS PREFORM FOR OPTICAL FIBER INCLUDING CONSOLIDATING IN A FURNACE WITH A TEMPERATURE GRADIENT

[75] Inventors: Masumi Ito; Toshio Danzuka; Yuichi Ohga; Sumio Hoshino; Ichiro Tsuchiya, all of Yokohama, Japan

[73] Assignee: Sumitomo Electric Industries, Ltd., Osaka, Japan

[21] Appl. No.: 204,100

[22] Filed: Mar. 2, 1994

[30] Foreign Application Priority Data

Mar. 3, 1993 [JP] Japan .................................. 5-042774

[51] Int. Cl.$^6$ .................................................. C03B 37/012
[52] U.S. Cl. .................................................. 65/384; 65/427
[58] Field of Search ........................... 65/427, 379, 424, 65/384, 488

[56] References Cited

U.S. PATENT DOCUMENTS

| | | | |
|---|---|---|---|
| 4,789,389 | 12/1988 | Schermerhorn | 65/427 |
| 4,842,628 | 6/1989 | Kreutzer | 65/427 |
| 5,022,904 | 6/1991 | Ishiguro | 65/424 |
| 5,236,482 | 8/1993 | Danzuka et al. | |
| 5,330,548 | 7/1994 | Danzuka | 65/427 |

FOREIGN PATENT DOCUMENTS

| | | |
|---|---|---|
| 0473104 | 3/1992 | European Pat. Off. . |
| 0523692 | 1/1993 | European Pat. Off. . |
| 3711281 | 6/1988 | Germany . |
| 63-201025 | 8/1988 | Japan . |
| 63 48491 | 7/1989 | Japan . |
| 93 23341 | 11/1993 | WIPO . |

*Primary Examiner*—W. Gary Jones
*Assistant Examiner*—John Hoffmann
*Attorney, Agent, or Firm*—Cushman Darby & Cushman L.L.P.

[57] ABSTRACT

In order to provide an improved process for the production of a glass preform for an optical fiber which includes substantially no bubble formation therein and also has a substantially uniform shape, the present invention provides a process for the production of a glass preform which is at least partially formed from silica. In particular, a body is formed on a rod by depositing fine glass particles thereon, preferably by the vapor phase reactions, and heating the body to vitrify under a reduced atmosphere or a vacuumed atmosphere so that the glass preform is produced. According to this process, the heating includes a first heating step of degassing the body at a first heating temperature, a second heating step of shrinking the body at a second heating temperature which is higher than the first heating temperature and which is lower than a third heating temperature, and a third heating step of vitrifying the shrunken body at the third temperature which corresponds to a vitrification temperature of the fine glass particles so as to produce the glass preform.

10 Claims, 3 Drawing Sheets

Glass Body

# PROCESS FOR PRODUCTION OF GLASS PREFORM FOR OPTICAL FIBER INCLUDING CONSOLIDATING IN A FURNACE WITH A TEMPERATURE GRADIENT

BACKGROUND OF THE INVENTION

1. Field of the Invention

The present invention relates to a process for the production of a glass preform for an optical fiber, and in particular a glass preform comprising at least silica from which an optical fiber is directly drawn without any additional treatment to the preform or an intermediate glass preform from which an optical fiber is drawn after some additional treatment to the preform.

2. Description of the Related Art

A glass preform comprising at least silica for an optical fiber is produced by heating, at an elevated temperature, a body comprising fine glass particles, which are deposited on a rod by vapor phase reactions (which deposition process is known in the field as, for example, the outside chemical vapor deposition process and the vapor phase axial deposition (VAD) process), in an electrical furnace so that the glass particle deposited body is vitrified (namely consolidated). Such a consolidation process has been conventionally carried out by heating the body at an atmospheric pressure under an atmosphere filled with helium gas or an inert gas containing a small amount of a halogen gas. In such a process, a gas contained in the fine glass particles of the body remains confined within the body when the body is consolidated, which causes a problem that the consolidated body (namely the consolidated preform) includes bubbles therein.

In order to solve such a problem, Japanese Patent Kokai Publication No. 63-21025 discloses a process for the vitrification of a glass preform in which the preform is heated under a vacuumed atmosphere or a reduced atmosphere. In this process, since the atmosphere is reduced or vacuumed, the body comprising the fine particles are degassed so that it is expected that no bubbles remain in the vitrified body.

FIG. 2 schematically shows a conventional apparatus for the production of the glass preform for the optical fiber. The apparatus comprises a vacuum vessel (10) in which a muffle tube (2) surrounding a fine particle deposited body (1) and a heating member (8) positioned outside the muffle tube (2) are placed. A thermal insulation (a heat shield) (9) is located between the heating element 8 and a wall of the vessel (10). The vessel (10) is further equipped with an evacuation port to which a vacuum pump (7) is connected through a vacuum line (6) so that the atmosphere inside the vessel can be vacuumed or reduced. The glass particle deposited body (1) inserted in the muffle tube (2) is consolidated there by heating it with the heating member (8).

However, it has been found that the bubbles remain in the preform when the apparatus as shown in FIG. 2 is used for the consolidation of the glass preform in the form of a rod under the reduced or the vacuumed atmosphere and a predetermined temperature condition as schematically shown in FIG. 3 (a consolidation temperature is usually in a range of 1550° to 1650° C.) in the conventional manner. The produced glass preform has a longitudinally non-uniform shape in its outer diameter as schematically shown in FIG. 4, which shows both end portions of the preform having a greater thickness than the central portion thereof. In order to produce a glass article having a good quality from the glass rod produced by the above process, the bubbles should be stably suppressed or eliminated and the outer diameter of the consolidated glass rod should be uniform.

SUMMARY OF THE INVENTION

It is, therefore, an object of the present invention to provide an improved process for the production of a glass preform for an optical fiber which includes substantially no bubble formation therein and also has a substantially uniform shape so as to overcome the above-described problems.

According to the present invention, there is provided a process for the production of a glass preform which comprises at least silica for an optical fiber comprising producing a body comprising a rod on which fine glass particles are deposited preferably by the vapor phase reactions and heating the body to vitrify (namely, consolidate) under a reduced atmosphere or a vacuumed atmosphere so that the glass preform is produced. According to this process, the heating comprises a first heating step of degassing the body at a first heating temperature, a second heating step of shrinking the body at a second heating temperature which is higher than the first heating temperature and which is lower than a third heating temperature, and a third heating step of consolidating the shrunken body at the third temperature which corresponds to a consolidation temperature of the fine glass particles so as to produce the glass preform.

In the present invention, the fine glass particle deposited body may be produced by any conventional process, such as the VAD process, the CVD process and the like. In principle, the atmosphere during the heating steps is continuously or successively evacuated in a conventional means such as a vacuum pump from an apparatus in which the heating steps are carried out. Optionally, the atmosphere may comprise an inert gas, a halogen gas, a halogenated gas or a mixture thereof for a predetermined purpose such as dehydration, fluorine doping and the like, if necessary, according to the conventional knowledge, provided that the following specified pressure (degree of vacuum) and the following specified heating temperature are ensured.

For example, the body may be a composite which is produced by depositing the fine glass particles around a glass rod having an at least double waveguide structure of which refractive index is lower in its outer portion than its core portion.

DETAILED DESCRIPTION OF THE INVENTION

According to the present invention, the first heating step is preferably conducted in a temperature range of 1000° to 1300° C. while the atmosphere in the furnace is evacuated with a vacuum pump until a pressure of the atmosphere (a degree of vacuum) reaches 10 Pa or less and more preferably 5 Pa or less.

The second heating step is preferably carried out at a pressure of 10 Pa or less and more preferably 5 Pa or less while maintaining the second heating temperature in a range of 1320° to 1480° C. and more preferably 1350° to 1450° C. for 10 to 120 minutes and more preferably 40 to 90 minutes while the evacuation is continued if necessary. In addition, a heating member which is located around a muffle tube and which heats the degassed body may comprise a plurality of heating elements which are located separately along a longitudinal direction of the body and which can control the heating temperature of degassed body portions independently from one another so that the heating elements can heat the degassed body portions to different temperatures along the length of the preform. Also, the plurality of the heating elements may be so arranged that a lower portion of the degassed body is heated to a temperature equal to or higher than a temperature of an upper portion of the degassed body which is located above the lower portion.

The third heating step is carried out at a pressure of 10 Pa or less and more preferably 5 Pa or less in a temperature range of 1490° to 1600° C. and more preferably 1500° to 1550° C. for 1 to 60 minutes and more preferably 5 to 20 minutes.

Figure 5:
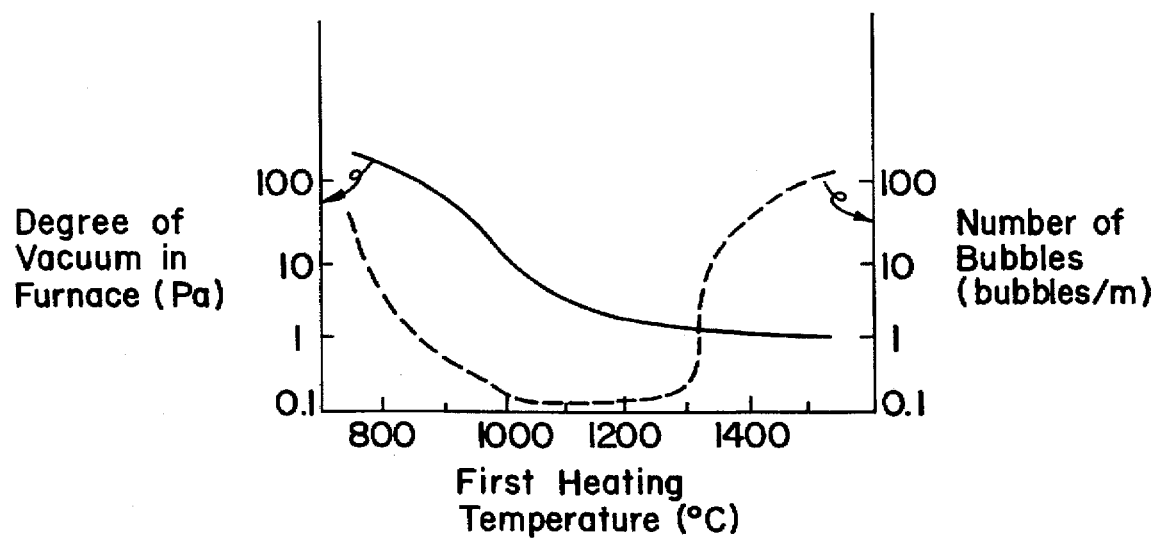
FIG. 5 is a graph showing a relationship between a first heating temperature and an attained degree of vacuum (namely an attained reduced pressure) in a first heating step and also a relationship between the first heating temperature and a number of bubbles contained in a consolidated glass preform per unit length of the preform.

The present inventors carried out the heating treatment of a fine glass particle deposited body in a reduced atmosphere while evacuated with the vacuum pump, and obtained a relationship between the first heating temperature and an attained degree of vacuum. A solid line in the graph of FIG. 5 shows such a relationship after 5 hours have been passed from the beginning of the heating. As seen from the graph, when the first heating temperature is 1000° C. or more, the attained degree of vacuum is 10 Pa or less.

After the first heating step, the body was heated to 1550° C. so as to consolidate the body and then a number of bubbles contained in the consolidated body was obtained. The results are also shown in the graph of FIG. 5 with a broken line, which shows a relationship between the first heating temperature and the number of the bubbles finally confined in the vitrified body per one meter length of the body. As seen from the broken line, when the first heating temperature is in a range of 1000° to 1300° C., nearly no bubbles remain in the body. On the other hand, when the first temperature is outside of such a specified range, the number of the contained bubbles is sharply increased.

Although not bound by any theory, the reason why the above results were obtained could be as follows: A degassing rate itself from the fine glass particle deposited body is larger at a higher first heating temperature. However, the body shrinks more readily at the higher degassing temperature so that gases tend not to be removed due to the shrinkage. Thus, since the degassing rate is smaller at the first heating temperature below 1000° C. or since the shrinkage already begins before a sufficient amount of the gas has been removed at the first heating temperature above 1300° C., the bubbles are likely to be confined in the body. Therefore, on the basis of the results shown in FIG. 5, in order to produce the consolidated glass preform with substantially no bubbles, it is critical that the glass body is heated to a temperature range of 1000° to 1300° C. until the pressure inside the furnace reaches 10 Pa or less, and then the body is further heated to the higher temperature so as to consolidate the body.

Figure 6:
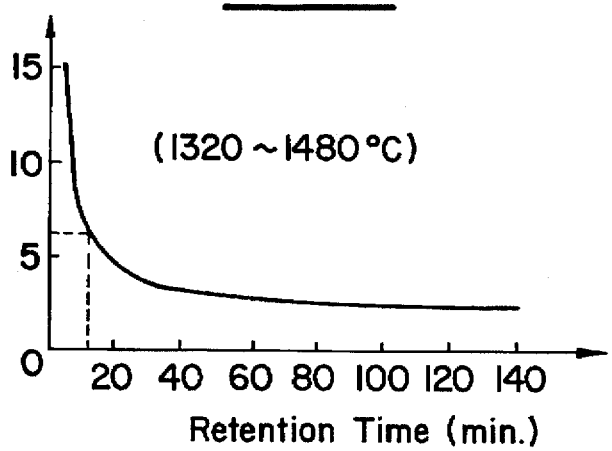
FIG. 6 is a graph showing a relationship between a retention time at a second heating temperature and an outer diameter difference of consolidated glass preform.
Figure 7:
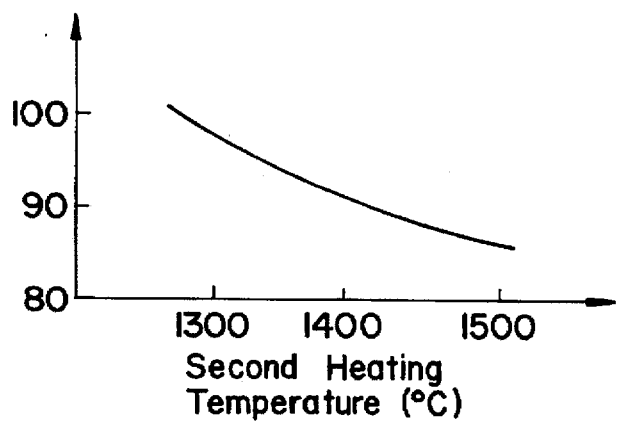
FIG. 7 is a graph showing a relationship between a second heating temperature and an outer diameter of a consolidated glass preform.

In the production of the optical fiber preform, one more factor which is as important as the number of the bubbles contained in the preform is uniformity of the outer diameter of the glass preform along its length. The present inventors have found that there is a strong correlation of a retention time during which the degassed body is maintained at the second heating temperature in a range of 1320° to 1480° C. versus an outer diameter difference between around a middle portion and around a lower portion of the body (namely, "a diameter around the lower portion of the body" minus "a diameter around the central portion of the body") in the finally produced preform. Such a correlation is shown in FIG. 6. In addition, the inventors have further found a correlation between the second heating temperature and an outer diameter of a middle portion of the glass preform body after finally consolidation, and the correlation is shown in FIG. 7. This is because shrinkage along a radial direction of the body is larger at a higher temperature so that such a correlation is obtained. On the basis of the results shown in FIG. 7, it is effective to carry out the second heating step so as to increase the temperature of the lower portion of the degassed body relative to the temperature of the upper portion of the degassed body and/or to decrease the temperature of the upper portion of the degassed body relative to the temperature of the lower portion of the degassed body in order to prevent the larger outer diameter of the lower portion of the glass body.

Figure 1:
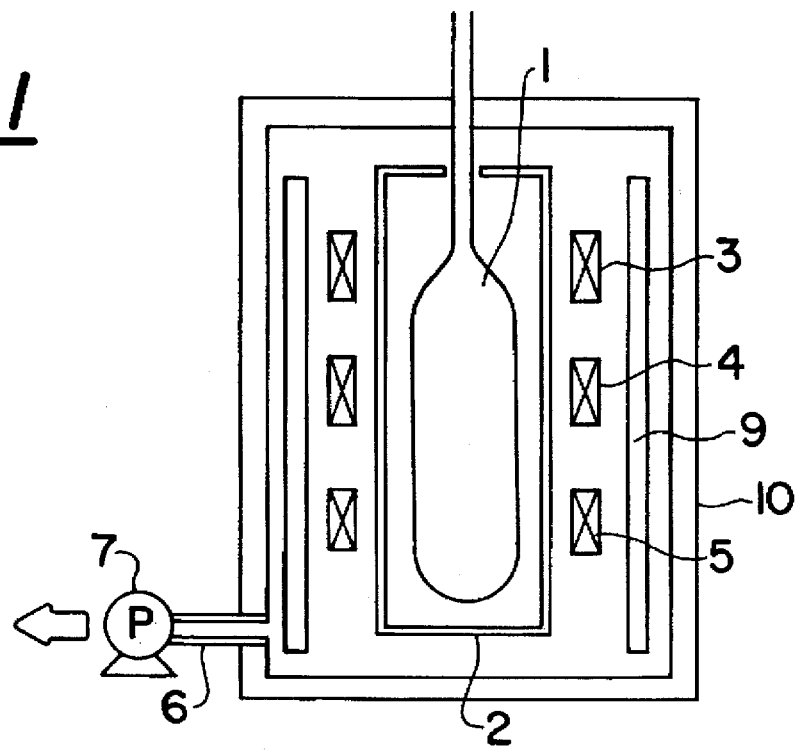
FIG. 1 schematically shows a heating furnace used in one embodiment of the present process in which a plurality of (for example three) heating elements (3, 4 and 5) are provided so as to constitute a heating member, in which the numeral (1) indicates a fine glass particle deposited body, (2) indicates a muffle tube in which the body (1) is inserted and heated, (3) indicates an upper heating element, (4) indicates a middle heating element, (5) indicates a lower heating element, (6) indicates a degassing conduit, (7) indicates a vacuum pump, (9) indicates a heat shield and (10) indicates a vacuum vessel.
Figure 8:
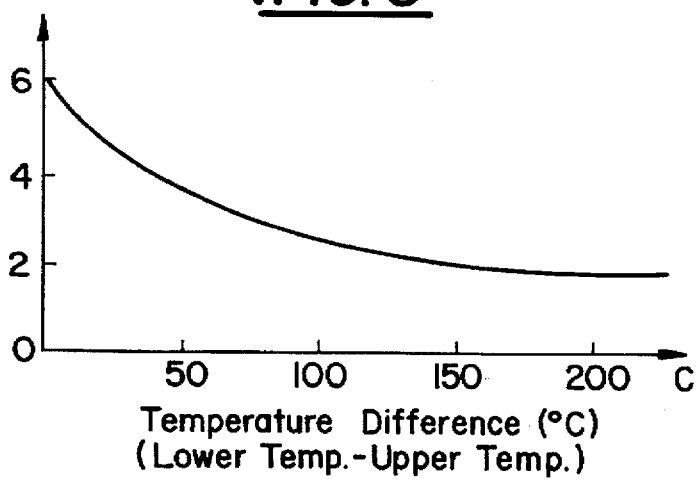
FIG. 8 is a graph showing a relationship of a temperature difference between a lower heating element and an upper heating element versus an outer diameter difference of a consolidated preform between around a lower portion and around a middle portion of the preform.

Therefore, one preferred embodiment according to the present invention may use a heating furnace as shown in FIG. 1 in which a heating member is divided into a plurality of heating elements (for example three heating elements 3, 4 and 5) located along a longitudinal direction of the degassed body and the heating temperature of each heating element is controlled independently from one another, so that the lower portion of the body may be heated to a temperature higher than a temperature to which the upper portion is heated. Using the heating furnace as shown in FIG. 1, a relationship, as shown in FIG. 8, was obtained as to the heating temperature difference between the lower heating element and the upper heating element versus the outer diameter difference between around the lower portion and the middle portion of the body. It has been found from the results that the diameter difference becomes less than 6 mm when the temperature of the lower heating element is higher than that of the upper heating element by 50° C. or more.

The third heating step is carried out in a range of 1490° to 1600° C. which corresponds to the consolidation temperature of the glass particle deposited body. It has been found that conducting the third heating step for a longer period than required causes droop of the vitrified preform due to its weight since the glass is very soft at the third heating temperature. Therefore, the period of the third heating step should be as short as required, and thus the period is preferably in a range of 1 to 60 minutes and more preferably 5 to 20 minutes.

As described above, since the fine glass particle deposited body is heated under such conditions that the gas contained in the body is sufficiently removed according to the present invention, substantially no bubbles are left in the vitrified glass body. In addition, the vitrified glass body having the uniform outer diameter is produced by relatively raising the heating temperature of the lower portion of the fine glass particle deposited body with using the heating member which is divided into the plurality of the independent heating elements.

EXAMPLES

The present invention will be, hereinafter, described with reference to the following Examples and Comparative Example. It should be understood that the present invention is not limited by the Examples.

Example 1

Using the heating furnace as shown in FIG. 1, a fine silica glass particle deposited body (1) produced by the VAD process was heated to be consolidated according to the present invention. The body had outer diameter of 200 mm and a length of 1000 mm. The body was inserted in a muffle tube (2) located in the vacuum vessel (10) and heated to a temperature of 1200° C. while the atmosphere was evacuated from the furnace. When the temperature was reached to 1200° C., the pressure in the furnace was 20 Pa. However, after the furnace was maintained at that temperature for three hours, the pressure was reduced to 3 Pa. Then, a temperature of the upper heating element 3 was increased to 1330° C., a temperature of the middle heating element 4 was increased to 1400° C., and a temperature of the lower heater was increased to 1470° C. Such an increased temperature condition was maintained for one hour, and the pressure inside the furnace was constant at about 3 Pa during said one hour. Thereafter, the body was heated to 1550° C. and maintained at that temperature for 15 minutes, and the pressure inside the furnace was still constant at about 3 Pa. Then the body was cooled and observed. The body was of such a good quality that it had substantially no bubbles over its whole length. The outer diameter of the body was substantially uniform such that it was 90 mm±1.2 mm over its whole length.

Comparative Example 1

Figure 2:
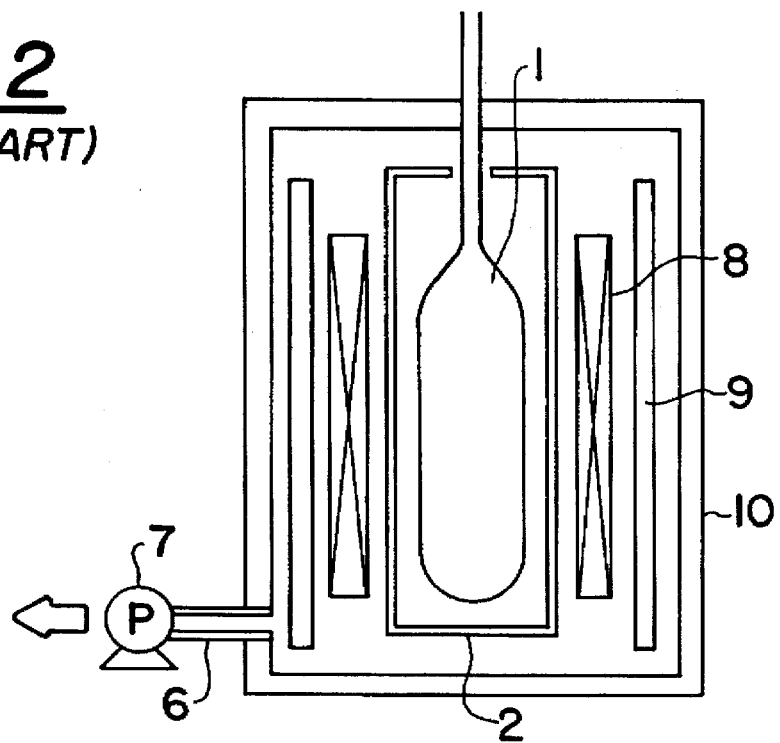
FIG. 2 schematically shows a conventional heating furnace.
Figure 3:
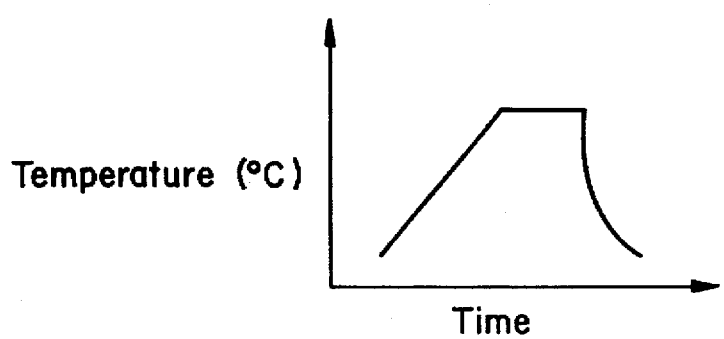
FIG. 3 is a graph which schematically shows a temperature condition in a conventional heating process for forming a consolidated glass preform.
Figure 4:
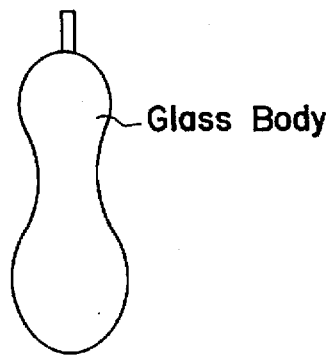
FIG. 4 schematically shows a shape of a glass preform produced in a conventional process which has different diameters along its length.

The same fine glass particle deposited body as in Example 1 was inserted in a muffle tube 2 placed in the vacuum vessel as shown in FIG. 2, and the pressure inside the furnace was maintained at 30 Pa and heated to a temperature of 1600° C. for 30 minutes. Then, the body was cooled and taken out of the furnace. The body contained small bubbles having a size of 0.1 mm or less over its whole length and had a deformed form such that an outer diameter around the center portion was as thin as 76 mm, and the outer diameter around a lower portion was as thick as 90 mm.

Example 2

The same fine glass particle deposited body as in Example 1 was inserted in the muffle tube 2 placed in the apparatus as shown in FIG. 1 which had been already preheated to a temperature of 800° C. When the body was heated to 1300° C. and maintained at such a temperature for two hours while evacuated in the first heating step, the pressure inside the furnace attained to 5 Pa. Then, the body was further heated so as to initiate the second heating step in which the upper heating element was set to 1320° C., the middle one to 1390° C. and the lower one to 1470° C. and such a different temperature condition was maintained for one hour. Thereafter, in order to carry out the third heating step, the upper heating element was set to 1550° C., the middle one to 1525° C. and the lower one to 1500° C. and such a different increased temperature condition was maintained for 30 minutes, and then cooled. During the third heating step, the pressure inside the furnace was constant at 5 Pa. The produced glass preform was of such a good quality that it had substantially no bubbles over its whole length. The outer diameter of the body was substantially uniform such that it was 90 mm±0.8 mm over its whole length.

What is claimed is:

1. A process for producing a silica-containing glass preform for an optical fiber, comprising the steps of:

depositing glass particles on a rod to form a body, the body having a longitudinal axis and at least a lower portion and an upper portion; and heating the body at a reduced pressure, wherein said heating step further comprises:

a first heating step of degassing the body at a first heating temperature, a second heating step of shrinking the body by subjecting the upper and lower portions of the body to respective second heating temperatures which are higher than the first heating temperature, the second heating temperature for the lower portion of the body being higher than the second heating temperature for the upper portion of the body, and a third heating step of consolidating the body at a third temperature which is higher than the second heating temperatures and which consolidates the fine glass particles.

2. The process according to claim 1, wherein the first heating temperature is between 1000° C. and 1300° C., and wherein said first heating step is continued until a degree of vacuum of the reduced pressure reaches 10 Pa or less.

3. The process according to claim 1, wherein the second heating temperatures range between 1320° C. and 1480° C., and wherein said second heating step is conducted at a degree of vacuum of the reduced pressure of 10 Pa or less for 10 to 120 minutes.

4. The process according to claim 1, wherein the third heating temperature is between 1490° C. and 1600° C., and wherein said third heating step is conducted at a degree of vacuum of the reduced pressure of 10 Pa or less for 1 to 60 minutes.

5. The process according to claim 1, wherein the body is a composite, and wherein the rod is glass and has a core portion and an outer portion and a refractive index which is lower in the outer portion than in the core portion.

6. A process for producing a silica-containing glass preform for an optical fiber, comprising the steps of:

depositing glass particles on a rod to form a body, the body having a longitudinal axis, upper and lower ends, and a plurality of portions located therebetween; and heating the body at a reduced pressure, wherein said heating step further comprises:

a first heating step of degassing the body at a first heating temperature;

a second heating step of shrinking the body by subjecting each of said plurality of portions to respective second heating temperatures which are higher than the first heating temperature, the second heating temperature for any selected portion being higher than the second heating temperature for the portions located closer to the upper end, and a third heating step of consolidating the body at a third temperature which is higher than any of the second heating temperatures and which consolidates the fine glass particles.

7. The process according to claim 6, wherein the first heating temperature is between 1000° C. and 1300° C., and wherein said first heating step is continued until a degree of vacuum of the reduced pressure reaches 10 Pa or less.

8. The process according to claim 6, wherein the second heating temperatures range between 1320° C. and 1480° C., and wherein said second heating step is conducted at a degree of vacuum of the reduced pressure of 10 Pa or less for 10 to 120 minutes.

9. The process according to claim 6, wherein the third heating temperature is between 1490° C. and 1600° C., and wherein said third heating step is conducted at a degree of vacuum of the reduced pressure of 10 Pa or less for 1 to 60 minutes.

10. The process according to claim 6, wherein the body is a composite, and wherein the rod is glass and has a core portion and an outer portion and a refractive index which is lower in the outer portion than in the core portion.

* * * * *